(12) United States Patent
Song

(10) Patent No.: US 12,248,805 B2
(45) Date of Patent: Mar. 11, 2025

(54) FOCUS CONTROLLING METHOD, ELECTRONIC DEVICE AND STORAGE MEDIUM

(71) Applicant: Beijing Xiaomi Mobile Software Co., Ltd., Beijing (CN)

(72) Inventor: Wenju Song, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 331 days.

(21) Appl. No.: 17/681,068

(22) Filed: Feb. 25, 2022

(65) Prior Publication Data

US 2023/0051875 A1 Feb. 16, 2023

(30) Foreign Application Priority Data

Aug. 13, 2021 (CN) .......................... 202110930542.9

(51) Int. Cl.
  *G06F 3/0482* (2013.01)
  *G06F 3/04812* (2022.01)
  *G06F 3/0485* (2022.01)
  *G06F 9/48* (2006.01)

(52) U.S. Cl.
  CPC .............. *G06F 9/48* (2013.01); *G06F 3/0485* (2013.01)

(58) Field of Classification Search
  None
  See application file for complete search history.

(56) References Cited

U.S. PATENT DOCUMENTS

| | | | |
|---|---|---|---|
| 9,733,818 B2* | 8/2017 | Chai | G06F 3/0485 |
| 2006/0095867 A1 | 5/2006 | Rogalski et al. | |
| 2006/0253791 A1* | 11/2006 | Kuiken | G06F 3/0481 |
| | | | 715/802 |
| 2010/0211908 A1 | 8/2010 | Luk et al. | |
| 2012/0173975 A1* | 7/2012 | Herz | H04N 21/8193 |
| | | | 715/830 |
| 2017/0357398 A1* | 12/2017 | Alonso-Ruiz | G06F 3/04817 |
| 2019/0191208 A1* | 6/2019 | Coenen | H04N 21/4312 |
| 2019/0346977 A1* | 11/2019 | Chen | H04N 21/485 |
| 2022/0269406 A1* | 8/2022 | Aggrawal | G06F 3/04892 |
| 2023/0051875 A1* | 2/2023 | Song | G06F 3/0489 |

FOREIGN PATENT DOCUMENTS

| | | |
|---|---|---|
| CN | 102547463 A | 7/2012 |
| CN | 103546818 A | 1/2014 |
| CN | 103916710 A | 7/2014 |
| CN | 107087234 A | 8/2017 |
| CN | 107835461 A | 3/2018 |

(Continued)

OTHER PUBLICATIONS

Extended European Search Report dated Sep. 15, 2022 for European Patent Application No. 22158380.0.

*Primary Examiner* — Hyun Nam
(74) *Attorney, Agent, or Firm* — Volpe Koenig

(57) ABSTRACT

A focus controlling method that determines, in response to scrolling of a display interface of an electronic device, control information of a first control having focus in a first display interface before the scrolling; and displays, according to the control information of the first control and an interface scrolling direction, a second control to receive focus of a second display interface after the scrolling.

15 Claims, 4 Drawing Sheets

Determine a second control to receive focus on the second display interface after scrolling the display interface, based on the control information of the first control and the interface scrolling direction — 121

Display the focus on the second control in the second display interface — 122

(56) References Cited

FOREIGN PATENT DOCUMENTS

| | | | |
|---|---|---|---|
| CN | 110209327 | A | 9/2019 |
| CN | 111010601 | A | 4/2020 |
| CN | 111447484 | A | 7/2020 |
| CN | 112416189 | A | 2/2021 |
| CN | 113032055 | A | 6/2021 |
| EP | 1909192 | B1 | 3/2010 |

* cited by examiner

FOCUS CONTROLLING METHOD, ELECTRONIC DEVICE AND STORAGE MEDIUM

CROSS REFERENCE TO RELATED APPLICATIONS

The disclosure is filed based on and claims priority to Chinese Patent Application No. 2021109305429 filed on Aug. 13, 2021, the entire contents of which are incorporated herein by reference.

BACKGROUND

For a display interface presented by some electronic devices, such as a television, interaction is usually performed through user manipulation of physical buttons on a remote control device. As a result, a focus position needs to be displayed on the display interface at all times to inform a user of currently operable control elements. A focus is one of the visual elements of the display interface that is selected to receive the user interaction. In the related art, research on focus technology mostly centers around research on a display state of the focus on the same display interface presentation, such as animation display of the focus, etc. The subject of focus display during scrolling of the display interface is yet to be studied.

SUMMARY

The disclosure relates to the technical field of electronics, in particular to a focus controlling method, an electronic device and a storage medium. According to a first aspect of examples of the disclosure, a focus controlling method is provided and applied to an electronic device, and includes: determining, in response to scrolling of a display interface of the electronic device, control information of a first control having focus in a first display interface before the display interface scrolling; and displaying, according to the control information of the first control and a display interface scrolling direction, a second control to receive focus of a second display interface after the display interface scrolling.

According to a second aspect of examples of the disclosure, an electronic device is provided, and includes: a processor; and a memory configured to store instructions executable by the processor. When the processor executes the instructions the processor is configured to: determine, in response to scrolling of a display interface of the electronic device, control information of a first control having focus in a first display interface before the display interface scrolling; and display, according to the control information of the first control and a display interface scrolling direction, a second control to receive focus of a second display interface after the display interface scrolling.

A third aspect of examples of the disclosure, a non-transitory computer-readable storage medium is provided. When computer executable instructions in the storage medium are executed by a processor of an electronic device, the electronic device is configured to: determine, in response to scrolling of a display interface of the electronic device, control information of a first control having focus in a first display interface before the display interface scrolling; and display, according to the control information of the first control and a display interface scrolling direction, a second control to receive focus of a second display interface after the display interface scrolling.

It should be understood that the foregoing general description and the following detailed description are examples and explanatory and are not intended to limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

DETAILED DESCRIPTION

Figure 1:
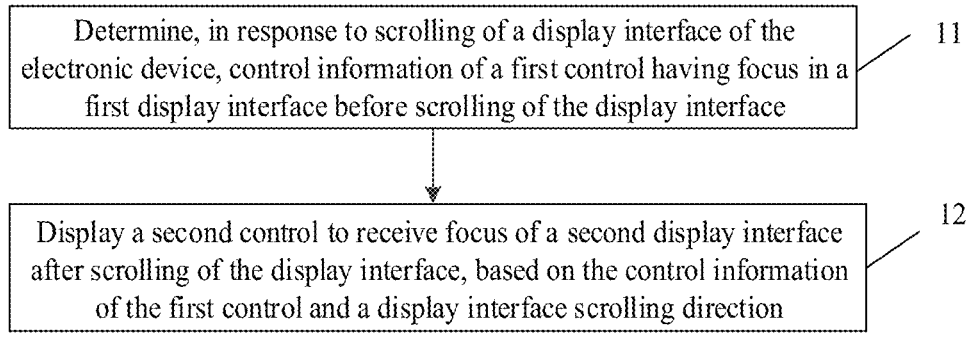
FIG. 1 is a flow chart of a focus controlling method according to an example of the disclosure.

Examples will be described in detail herein, instances of which are illustrated in the accompanying drawings. When the following description refers to the accompanying drawings, the same numbers in different drawing figures represent the same or similar elements unless otherwise indicated. The implementations described in the following examples do not represent all implementations consistent with the disclosure. On the contrary, they are instances of an apparatus and a method consistent with some aspects of the disclosure as detailed in the appended claims.

In the field of computers, a focus refers to a region of concern in a display interface, i.e., a position on a display screen at which a current cursor is activated, for indicating which control element of a display interface is selected or which control element may be operated.

It should be noted that ViewPager, as a widget for control of an Android system, is widely applied to Apps of an Android phone, but the control has a certain defect when being used on a television based on an Android operation system. A root cause of the defect is that the television is operated by a remote control instead of a touch screen and all user interactions are achieved by moving a focus of a display interface of the television display screen. A specific defect is that, during scrolling of the display interface, there will be a problem of focus skipping. ViewPager has an automatic focus finding function. However, a focus generated by automatic focus finding during scrolling of the display interface is not necessarily an actual focal point that a user wants.

The disclosure may be applied to an automatic focus finding scenario of ViewPager. For example, during scrolling of a display interface, a condition that a control to receive focus cannot be found will occur, so a focus of a current display interface will be lost. It can be understood that, in order to facilitate a user's selecting a control on the display interface, the display interface has only one focus at a time, and a focus is displayed after drawing of the display interface. Based on an existing automatic focusing manner, during scrolling of the display interface, the control having focus of the current display interface will be obtained by a control on an outermost layer of the display interface, for instance, by an entire display interface as a control. When an electronic device draws a control on the display interface after scrolling the display interface, the focus is automatically given to a control in a preset row or a preset column. Consequently, when the existing automatic focusing manner is adopted, a phenomenon of focus skipping will occur during scrolling of the display interface.

The disclosure improves an automatic focusing scheme for scrolling of a display interface of an electronic device, aiming to realize a focus displaying scheme of automatic focusing with a better visual experience. Onto achieve this goal, the disclosure provides a focus controlling method.

The method is applied to the electronic device. The electronic device may specifically be a smart television, a laser projection television, a projector, or a television set-top box. It can be understood that the method may be applied to any electronic device having a display function, for instance, be applied to an electronic device which has a display itself, or an electronic device that can be connected with a display and can provide display data for the display.

FIG. 1 is a flow chart of a focus controlling method according to an example of the disclosure. As shown in FIG. 1, the method may include the following steps: at step 11, determine, in response to scrolling of a display interface of the electronic device, control information of a first control having focus in a first display interface before scrolling of the display interface; and at step 12, display a second control to receive focus of a second display interface after scrolling of the display interface, based on the control information of the first control and a display interface scrolling direction.

Herein, the display interface refers to a displayed picture or graphical interface presented by the electronic device. For example, the display interface may be a television interface such as a guide in a grid arrangement provided by a television, or a projection interface provided by a projector, or a television interface provided by a laser projection television. Some regular or irregular controls may be included on the display interface. To facilitate operation, a system will indicate a control having focus on the display interface. The control having focus is usually indicated in a certain manner on the display interface, so that the control having the focus may be selected or be operated. When a user does not want to operate a control currently having focus, the user may issue a remote control instruction through a remote control device, that is, an instruction received from a remote control device, such as a moving instruction, and the system will move the focus from the control currently having focus to another control, according to the received remote control instruction. Herein, the first control having focus in the first display interface before display interface scrolling, may be understood as a control last having focus before scrolling of the display interface.

Figure 2:
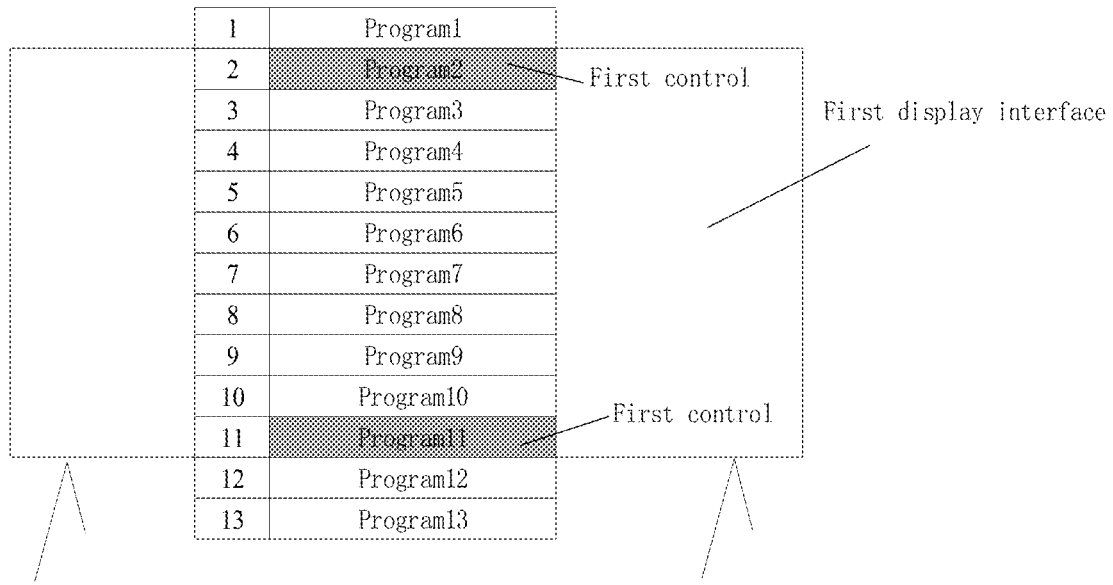
FIG. 2 is a schematic diagram of a scenario for a focus controlling method according to an example of the disclosure.

FIG. 2 is a schematic diagram of a scenario for a focus controlling method according to an example of the disclosure. In FIG. 2, two columns of controls are shown on the display interface as an example. One column contains program channel numbers and the other column contains program names. It can be given that any of the controls corresponding to the program channel numbers and the controls corresponding to the program names may be selected to receive focus. A television program detail page may be reached through user manipulation of an interface device such as a remote controller, to operate on the controls. For example, taking the display interface shown in FIG. 2 as an instance, when the display interface is scrolled downward, the first control focused in the first display interface before scrolling is "program 11", and when the display interface is scrolled upward, the first control focused in the first display interface before scrolling is "program 2".

In this disclosure, scrolling of the display interface may be understood as scrolling of the display interface according to a preset rule. For example, the display interface is divided into a plurality of rows and a plurality of columns, and the display interface may be scrolled according to a preset row quantity or a preset column quantity. The preset row quantity or the preset column quantity may be determined by an area occupied by controls of a next column or a next row to be displayed after scrolling. It can be understood that the larger the area occupied by the controls of the next column or the next row to be displayed after scrolling, the larger is the preset row quantity or the preset column quantity corresponding to scrolling of the display interface. It can be understood that, after scrolling according to the preset row quantity or the preset column quantity, the generated second display interface after the scrolling contains a part of the same displayed content displayed by the first display interface before scrolling. Alternatively, at least some of the displayed controls after the scrolling are the same as the displayed controls before the scrolling.

In some other examples, scrolling of the display interface may involve switch of an entire display interface. When the display interface is scrolled in a manner that involves switching the entire display interface, the second display interface generated after the scrolling can have displayed content that differs from the content displayed on the first display interface before the scrolling, and the displayed controls can also be different before and after the scrolling.

In this disclosure, the interface scrolling direction refers to an entering direction of a new display interface, or an exiting direction of an old display interface. Further, taking FIG. 2 as an instance, when a control having focus is located is at a bottom of the display interface, for instance, at a control "program 11", when a remote control instruction to move downward is received, the interface scrolling direction is considered to be upward, i.e., a direction of upward scrolling. Correspondingly, when the control having the focus is located at a top of the display interface, for instance, at a control "program 2", when a remote control instruction to move upward is received, the interface scrolling direction is considered to be downward, i.e., a direction of downward scrolling.

The interface scrolling direction may provide a direction basis for display of the focus of the second display interface. The focus of the second display interface after scrolling may be understood as a first control to receive focus appearing in the second display interface after scrolling of the display interface. In the example, display of the first control to receive focus in the second display interface after scrolling will be determined by considering the control information of the first control last having focus on the first display interface before scrolling in the interface scrolling direction.

It can be understood that the control information of the first control includes coordinate information of the first control on the display interface. For instance, the interface scrolling direction may serve as a basis for an abscissa or an ordinate corresponding to the control receiving focus in the second display interface displayed after the scrolling. For example, when the scrolling direction is a direction along the ordinate axis, the focus of the second display interface is fixedly displayed on a control at a coordinate position with at least the same ordinate value as the first control; and when the scrolling direction is a direction along the axis of the abscissa, the focus of the second display interface is fixedly displayed on a control on a coordinate position with at least the same abscissa value as the first control. In this way, a phenomenon of focus skipping during scrolling of the display interface can be reduced.

In some other examples, the control information of the first control includes row and column information of the first control. The interface scrolling direction may serve as a basis for row information or column information of the focus of the second display interface. For example, when the scrolling direction is a direction along a column, the focus of the second display interface is fixedly displayed on a control at least in the same column as the first control; and when the scrolling direction is a direction along a row, the focus of the second display interface is fixedly displayed on a control at least in the same row as the first control. In this way, the phenomenon of focus skipping during scrolling of the display interface can be reduced.

For example, with further reference to FIG. 2, taking two columns of controls being on the display interface as an instance, one column contains program channel numbers and the other column contains program names. Take an example in which scrolling of the display interface proceeds according to a preset row quantity or a preset column quantity. When the display interface scrolling direction is a direction along the ordinate axis is or is in a direction in which a column lies, on the basis of the control information of the first control indicating a "program 11" control having focus in the first display interface before scrolling, given by a control coordinate position of the first control or the column information of the first control, the focus of the second display interface after scrolling may be displayed on a control at a position at which "program 12" is located. In this way, the phenomenon of focus skipping during scrolling of the display interface can be reduced. It needs to be added that the interface scrolling direction may also be other directions.

It can be understood that, taking the display interface being square as an instance, the interface scrolling direction may proceed in one of two opposite directions with respect to a first edge of the display interface, and two opposite directions with respect to a second edge of the display interface. The first edge is perpendicular to the second edge. The display interface may also be circular. In short, the scrolling direction here may also be a direction in which focus is passed, which can be provided by a remote control device.

In the examples of the disclosure, when the focus of the second display interface after scrolling is displayed, the control information of the first control of the first display interface before scrolling and the interface scrolling direction will be taken into consideration. Accordingly, display of the focus of the second display interface is not taken as a default, as it is in the automatic focusing manner in the related art. With respect to the related art, the disclosure provides advantages in that a phenomenon of focus skipping during scrolling of a display interface in the is reduced, a visual effect of focus display is improved and a visual experience of the electronic device is improved.

In some examples, the interface scrolling direction is determined in the following manner. A direction indicated by an instruction received from a remote control device before scrolling of the display interface is determined as the interface scrolling direction. The remote control instruction includes a focus moving direction instruction. It can be understood that, as mentioned above, the interface scrolling direction refers to the entering direction of the new display interface, or the exiting direction of the old display interface. The direction indicated by the remote control instruction is opposite to the interface scrolling direction. In the example, by directly determining the interface scrolling direction based on the direction indicated by the remote control instruction, the interface scrolling direction can be obtained in a simpler, more convenient and faster way that the approach taken by prior art methods.

In some examples, the control information of the first control includes column information of the first control. Displaying, according to the control information of the first control and the interface scrolling direction, the second control to receive focus of the second display interface after the scrolling may include the following. In response to determining the interface scrolling direction is a first direction and according to the column information of the first control, only controls in a column in which the first control is located in the second display interface, is controlled to receive focus, so as to pass focus to a first preset control displayed in the second display interface having the same column as the first control. The first preset control is a control that is not displayed in the first display interface and is adjacent to the first control. The first direction may be a direction toward which the column of the first control is located.

It should be noted that scrolling of the display interface according to the preset row quantity or the preset column quantity is taken as one exemplary instance. Normally, when the display interface is scrolled in a direction toward which a column lies, the focus will be passed to the entire display interface first, and then passed to a new control appearing in a preset column of a new row, for instance, a first column. Taking a plurality of sets of vertically arranged list controls as an instance, one or more sets in the plurality of sets of vertically arranged list controls might not be completely displayed on one display interface. In that case, a column where a current first control is located is for instance, a second column. In this example, according to the column information of the first control, only controls in the column in which the first control is located in the second display interface, is controlled to receive focus. In other words, passing focus to controls other than those in the column indicated by the column information of the first control, such as the second column, is inhibited in the second display interface. In this way, the focus is automatically passed to a first control newly appearing in the second column of the second display interface, i.e. the first preset control.

For example, as shown in FIG. 2, the controls newly appearing in the second display interface relative to the first display interface are control "12" in the first column and control "program 12" in the second column. In the example, because passing focus to controls other than those in the second column is inhibited, the focus is automatically passed to the control corresponding to "program 12". In this way, compared with the related art where the focus skips to the control "12" in the first column, the examples provided herein can at least maintain the focus on a control in the column where the first control is located, and column skipping of the focus is reduced.

In some other examples, scrolling of the display interface involves a switch of the entire display interface. Normally, when the display interface is scrolled in the direction in which a column lies, the focus will be passed to the entire display interface first, and is then will be passed to a control on a first row and a first column. Taking the plurality of sets of vertically arranged list controls as an instance, one or more sets in the plurality of sets of a vertically arranged list of controls might not be completely fit on one display interface. In that case the column in which the current first control is located could be for instance, the second column.

In this example, according to the column information of the first control, only controls in the column in which the first control is located in the second display interface, is controlled to receive focus. In other words, passing focus to controls other than those in the column indicated by the column information of the first control, in this case the second column, is prohibited. In the current automatic focusing procedure the focus is automatically passed to the first preset control in a first row of the second column of the second display interface. In this way, the example can at least maintain the focus in the column where the first control is located, and by doing so, column skipping of the focus is reduced. In addition, because the first preset control is a control adjacent to the first control, continuity of a focusing moving operation can also be ensured.

In some examples, in response to determining that a direction indicated by the remote control instruction received by the second display interface is a direction opposite to the first direction, a capability to receive focus of controls other than those in the column where the first control is located in the second display interface, is restored. In some examples, the control information of the first control includes row information of the first control.

Displaying, according to the control information of the first control and the interface scrolling direction, the second control to receive focus of the second display interface after the scrolling may include, in response to determining the interface scrolling direction is a second direction, and according to the row information of the first control, only controls in a row in which the first control is located in the second display interface, can receive focus so as to pass focus to a second preset control displayed in the second display interface having a same row as the first control. The second preset control is a control that is not displayed in the first display interface and that is adjacent to the first control. The second direction may be a direction in which the row of the first control lies.

Scrolling of the display interface according to the preset row quantity or the preset column quantity is considered next. Normally, when the display interface is scrolled in the direction in which the row lies, the focus will be passed to the entire display interface first, and is subsequently passed to a new control appearing in a preset row of a new column, for instance, a first row. Taking a plurality of sets of horizontally arranged list controls as an instance, one or more sets in the plurality of sets of horizontally arranged list controls might not completely fit on one display interface, and in that case a row in which the current first control is located is for instance, a second row.

In this example, according to the row information of the first control, only controls in the row in which the first control is located in the second display interface is controlled to receive focus. In other words, passing focus to controls other than the row indicated by the row information of the first control, for example to the second row, in the second display interface is prohibited. In this way, the focus is automatically passed to a first control newly appearing in the second row of the second display interface, i.e. the second preset control. In this way, the example can at least maintain the focus in the row where the first control is located, and row skipping when passing the focus is reduced.

In some other examples, scrolling of the display interface involves switch of the entire display interface. Normally, when the display interface is scrolled in the direction in which the row lies, the focus will be passed to the entire display interface first, and is then passed to the control on the first row and the first column. Further taking the plurality of sets of horizontally arranged list controls as an instance, one or more sets in the plurality of sets of horizontally arranged list controls might not be completely displayed on one display interface. In that case, the row in which the current first control lies, is for instance the second row. In that example, according to the row information of the first control, only controls in the row in which the first control is located in the second display interface is controlled to receive focus.

In other words, passing focus to controls other than those in the row indicated by the row information of the first control, such as the second row, in the second display interface is prohibited. In this way, the focus is automatically passed to the second preset control in a first column of the second row of the second display interface. In this way, the example can at least maintain the focus in the row where the first control is located, and row skipping of the focus is reduced. In addition, because the second preset control is a control adjacent to the first control, continuity of the focusing moving operation can also be ensured.

In some examples, in response to determining that the direction indicated by the remote control instruction received by the second display interface is a direction opposite to the second direction, a capability to pass focus to controls other than the row in which the first control is located in the second display interface, is restored.

Figure 3:
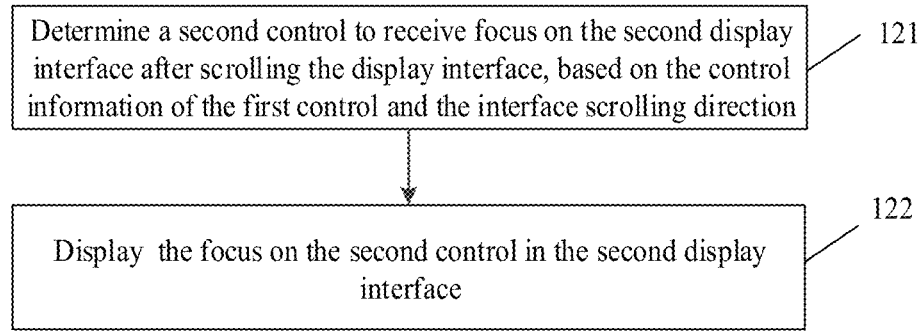
FIG. 3 is a flow chart of another focus controlling method according to an example of the disclosure.

FIG. 3 is a flow chart of another focus controlling method according to an example of the disclosure. As shown in FIG. 3, at step 12, focus is passed according to the control information of the first control and the interface scrolling direction. Passing the focus to a control in the second display interface after scrolling may include: step 121: determine a second control to receive focus on the second display interface after scrolling the display interface, based on the control information of the first control and the interface scrolling direction; and at step 122: the focus on the second control in the second display interface is displayed.

In some examples, when the interface scrolling direction is a first direction, the second control may be a control satisfying a preset condition and having the same column as the first control. The control satisfying the preset condition may be a new control adjacent to the first control, for example the first preset control or the second preset control mentioned above, or the second control may be a control with a highest operation rate. When the interface scrolling direction is a second direction, the second control may be a control satisfying the preset condition and having the same row as the first control.

In the automatic focus finding scenario of ViewPager, a focus finding task is usually pre-created. The focus finding task may be executed by a correlation function of FocusFind and may be used to perform focus positioning based on a focus moving instruction. For instance, a moving direction is indicated by an instruction received from a remote control device. In such an example, the step to determine the control information of the first control having focus in the first display interface before scrolling may include: in response to scrolling of the display interface, obtaining the control information of the first control having focus before scrolling, by invoking a getFocusedChild ( ) function in the focus finding task.

In another example, the step of displaying the second control receiving focus on the second display interface after scrolling, based on the control information of the first control and the interface scrolling direction, may include: ascertaining the second control to receive focus by invoking, for instance, a findNextFocus ( ) function in the Focus-Finder. This may include, for example, enabling the second control to actively obtain the focus by invoking a requestFocus ( ) function in the focus finding task.

In the example, it is not necessary to inhibit focus passing to controls in parts of rows or parts of columns on the second display interface. Therefore, there is no need to perform a restoring procedure in subsequent operations of the user, in order to restore the capability to pass focus to controls whose focusing ability was inhibited. Instead, the second control is directly positioned to receive focus, and the focus is displayed on the second control, so that focus loading performance of the electronic device can be improved.

In some examples, the step of displaying the focus on the second control of the second display interface may include the following. In response to the scrolling of the display interface, monitoring a drawing callback process in a scrolling process of the display interface. The drawing callback process is configured to notify the electronic device of displaying a drawn content. In response to execution of the drawing callback process, the focus on the second control of the second display interface is displayed. It can be understood that execution of the drawing callback process can trigger execution of a display process, i.e. execution of the drawing callback process is notifying the electronic device of displaying the drawn content.

In some examples, it may be determined whether the second display interface is drawn by monitoring the drawing callback process. When the second display interface is drawn, the second control is also drawn, and the focus of the second display interface can be timely displayed on the second control, so as to improve a visual experience of the focus on the display interface.

It can be understood that, the second display interface may be composed of one or more of a plurality of views. When the system is drawing the second display interface, it draws all new views of the second display interface in a sequence. In some examples, it may be determined whether a view is drawn that includes the second control to receive focus in the second display by monitoring the drawing callback process. When the view including the second control in the second display interface is drawn, the focus of the second display interface can be timely displayed on the second control, without waiting for all of the views to be drawing for the second display interface. Thus, a phenomenon of focus loss can be reduced and the visual experience of the focus on the display interface can be further improved.

In some examples, the method may include the following. In response to scrolling of the display interface, the control information of the first control having focus in the first display interface before scrolling is determined, and the control information of the first control is saved. The second control to receive focus on the second display interface after scrolling is determined based on the saved control information of the first control and the interface scrolling direction. In this way, through saving the control information of the first control, after the subsequent drawing callback process indicates that the display interface is drawn, the control information of the first control and the interface scrolling direction can be further called so as to determine the second control and display the focus on the second control. This mitigates a phenomenon that a focus is lost during scrolling and switching because the control information of the first control cannot be found and thus information of the second control cannot be found based on the control information of the first control. The interface scrolling extent is reduced by the disclosed technique, consequently reducing focus skipping.

In some examples, the method may include monitoring control information of a control having focus as well as the interface scrolling direction substantially in real time. In response to determining that the control information of the control having focus indicates that the control is a boundary control, and the interface scrolling direction is towards a boundary at which the boundary control is located, scrolling of the display interface is adjusted accordingly. It can be understood that, when the control information corresponds to a control in a last row given by a current display interface, or to a control in a last column given by the current display interface, the control indicated by the control information of the control having the focus is determined to be the boundary control.

It can be understood that different display interfaces display controls of different quantities or controls of different sizes. For different display interfaces, row information or column information of all controls on the current display interface needs to be reported to the system before the location of the focus with respect to the boundary can be monitored based on newly reported data. Other examples provide a way to simply and conveniently judge whether the display interface is scrolled.

In some other examples, before scrolling of the display interface of the electronic device, the method further includes: creating a focus finding task in advance of scrolling; and in response to the focus finding task indicating that a control to receive focus is not found, scrolling of the display interface is determined. The focus finding task is configured to find a control to receive focus in a current display interface.

The focus finding task may be the focus finding task mentioned in the above example. For example, in the automatic focus finding scenario of ViewPager, the focus finding task may be executed by a correlation function of FocusFind. It can be understood that, when the control currently having focus is located in a row boundary of a last row, when a remote control instruction of moving downward is received or the interface scrolling direction being an upward direction is detected, the control having focus cannot be positioned through the FocusFind function. When controls contained by the FocusFind function are empty, it may be inferred that interface scrolling is in progress.

In the examples of the disclosure, compared with judging scrolling of the display interface by combining row or column and the interface scrolling direction, by determining whether scrolling of the display interface is in progress by monitoring the focus finding task, a scrolling state of the display interface can be ascertained more accurately, and a misjudgment phenomenon can be reduced. Further, the system does not need to reassess relevant data of the control on every loaded display interface, so a processing burden of the system can be reduced, and performance of the system can be improved.

The disclosure provides further examples for a more detailed understanding of the focus controlling method provided by the examples of the disclosure. The description below takes an electronic device being a smart television as an instance, and takes a display interface being a television interface as an instance.

An application scenario of the example is a smart television. When there are multiple columns or rows of controls that cannot be fully displayed on one television interface, with further reference to FIG. 2, the television interface contains program channel numbers and program names. When a focus is moved to a top or bottom region of the television interface, when it is further moved upward or downward, a control in a corresponding direction is yet to be drawn in the television interface.

Figure 4:
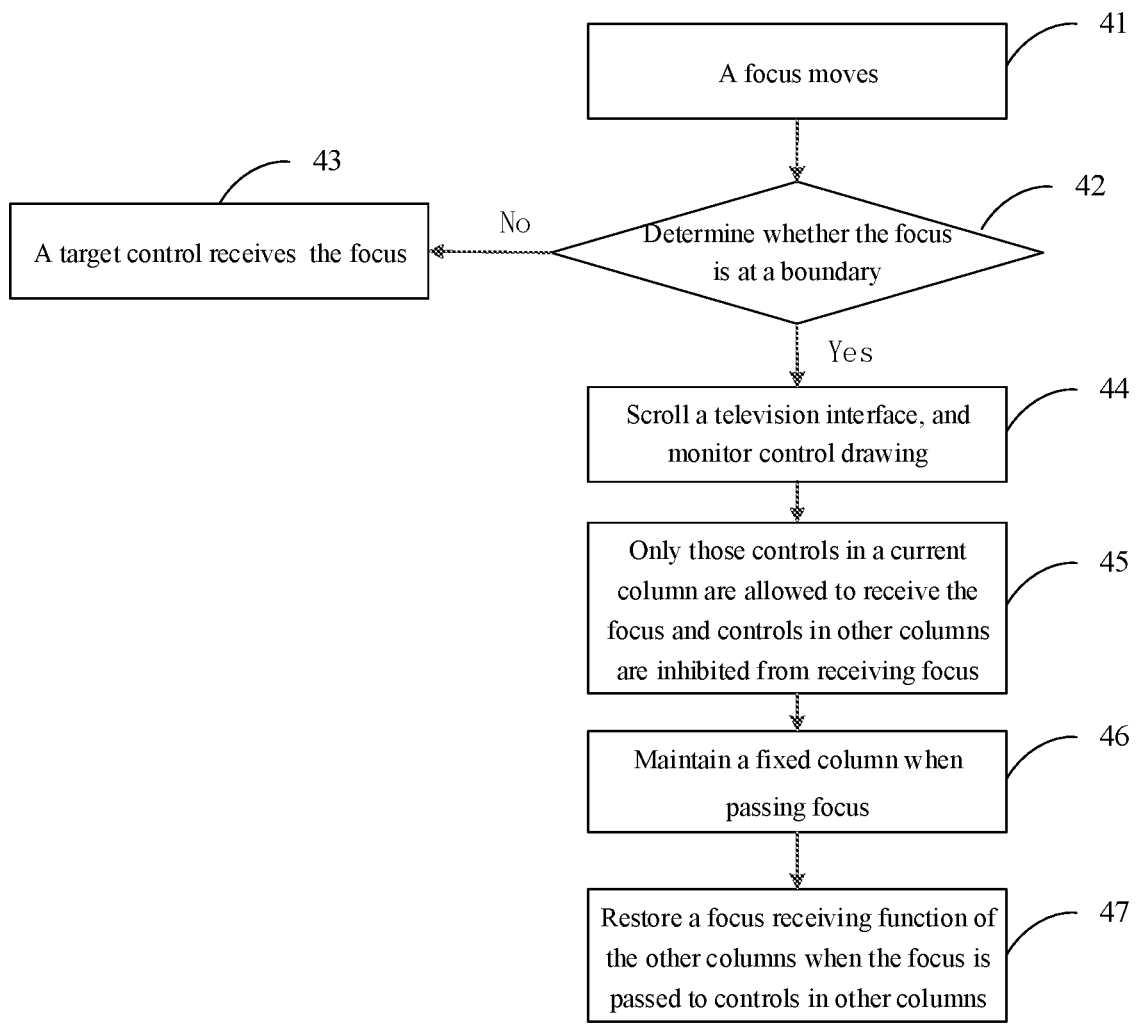
FIG. 4 is a flow chart of a focus controlling method according to an example of the disclosure.

FIG. 4 is a flow chart of a focus controlling method according to an example of the disclosure. As shown in FIG. 4, the method may include Step 41 at which the focus moves, or is passed from one control to another. Herein, the focus can move, or be passed to another control in response to receiving a remote control instruction that may indicate a direction in which to move focus. Upon receiving the instruction, the display is triggered to move the focus in the indicated direction.

At Step 42 it is determined whether the focus is at the boundary. If so, step 44 is executed. If not, step 43 is executed. Herein, determining whether the focus is at the boundary may be performed by monitoring the focus finding task mentioned in the above example. Then it can be determined whether the focus finding task finds the control to receive the focus in a current television interface. When the control is not found, it can be concluded that the focus is at the boundary. When it is found, a target control is determined. The target control refers to the control to receive focus in the current television interface. At Step 43 the target control receives the focus.

At Step 44 the television interface is scrolled, and control drawing is monitored. Monitoring control drawing may be implemented by the drawing callback process monitoring the interface scrolling process as mentioned above. In the example, by monitoring control drawing, presentation timing of an interface after interface scrolling may be determined, display timing of the focus is determined, and a phenomenon of focus loss is reduced.

At Step 45 only those controls in a current column are allowed to receive the focus and controls in other columns are inhibited from receiving focus. Herein, the current column refers to the second column shown in FIG. 2. Herein, allowing only those controls in the current column to receive the focus while preventing controls in other columns from receiving the focus may be realized in a manner described in the above example. That is, in response to the interface scrolling direction being the first direction, passing focus to controls other than those in the column in which the first control is located, in a second television interface is inhibited. The column in which the first control is located is determined based on the column information of the first control.

At Step 46, a fixed column is maintained when passing focus. Herein, interface scrolling can be conducted by scrolling according to a preset row quantity, for example by scrolling one row. Because the fixed column is maintained, when a new control appears on a last row, the system only passes focus to a control in the last row and the second column mentioned above, so that a position of the focus can be maintained basically unchanged, whereby the phenomenon of focus skipping is reduced, and the visual effect of the focus is improved.

At Step 47 when the focus is passed to controls in other columns, a focus receiving function of the other columns is restored. Herein, when the focus needs to be passed to other columns, the focus receiving function of other columns is restored. In this approach, only other columns in addition to the current column of the first control are prohibited from receiving focus. Compared with the related art where all controls in a second television interface are prohibited from receiving focus, the approach herein imposes a lower data processing burden and performance is better.

Figure 5:
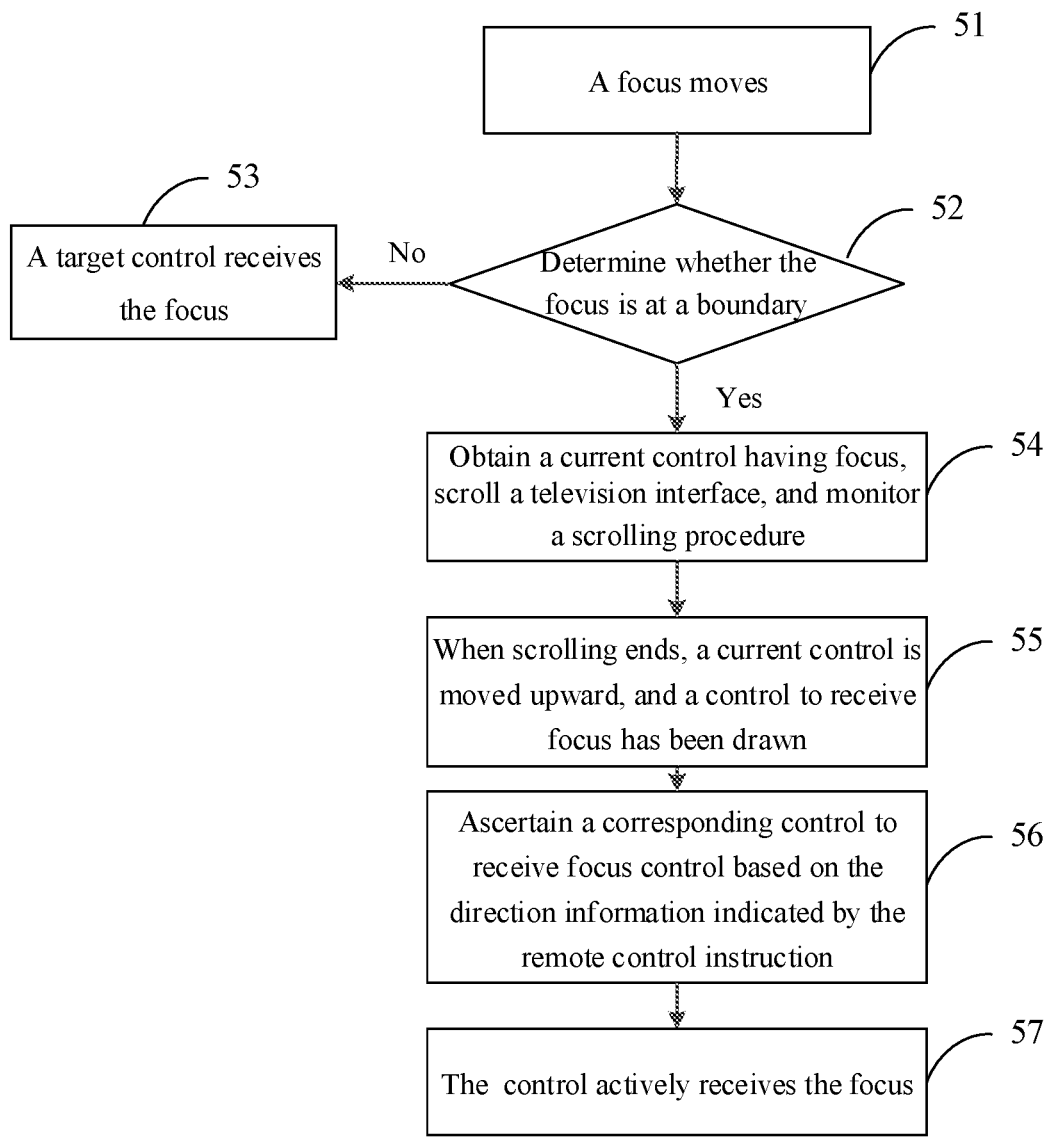
FIG. 5 is a flow chart of a focus controlling method according to another example of the disclosure.

Another example that reduces control data and improves system performance is described herein. FIG. 5 is a flow chart of a focus controlling method according to another example of the disclosure. As shown in FIG. 5, the method includes Step 51 at which the focus moves. At Step 52 it is determined whether the control receiving the focus is at a boundary. At Step 53 the target control receives the focus. Steps 51 to 53 herein are similar to steps 41 to 43 in the implementation described above.

At Step 54 a current control having focus is ascertained, the television interface is scrolled, and a scrolling procedure is monitored. Herein, ascertaining the current control having focus may ascertained through the getFocusedChild ( ) function, and then saved. The scrolling procedure in this example is the drawing callback process in the interface scrolling process mentioned above. At Step 55, when scrolling ends, the current control is moved upward, and a control to receive focus has been drawn.

When scrolling of the television interface is completed, the drawing callback process is triggered and is used to notify the system of displaying of the drawn content. Herein, scrolling ending refers to that point in execution of the drawing callback process being monitored, at which the current control is moved upward, and the control to receive the focus has been drawn.

At Step 56 a corresponding control to receive focus control is ascertained based on the direction information indicated by the remote control instruction. A control with relevance to the control information of the first control is again as the control to receive focus according to the direction information indicated by the remote control instruction. For example, the first preset control having the same column as the first control is determined according to the first direction indicated by the remote control instruction. Alternatively, the second preset control having the same row as the first control is ascertained according to the second direction indicated by the remote control instruction. At Step 57 the control actively receives the focus. In one implementation, the requestFocus ( ) function allows the control to receive the focus.

In the example, it is not necessary to inhibit controls in any other columns except the column where the first control is located in the second television interface from receiving the focus. Thus, focusing function restoration is not needed for those controls when the focus subsequently needs to be passed to controls in other columns. Thus, focus controlling operations are reduced, data processing burden is reduced, and performance of the system is improved. In addition, by monitoring the drawing callback process, the focus is timely allowed to pass to a control receiving the focus, so the phenomenon of focus loss is reduced, the visual effect of focus display is improved, and the visual experience of the electronic device is improved.

Figure 6:
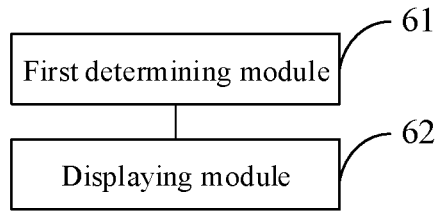
FIG. 6 is a block diagram of a focus controlling apparatus according to an example of the disclosure.

FIG. 6 is a block diagram of a focus controlling apparatus according to an example of the disclosure. The apparatus is integrated in an electronic device. With reference to FIG. 6, the apparatus includes: a first determining module 61, configured to determine, in response to scrolling of a display interface of the electronic device, control information of a first control having focus in a first display interface before the scrolling, and a displaying module 62, configured to display, according to the control information of the first control and an interface scrolling direction, a second control to receive focus of a second display interface after the scrolling.

In some examples, the apparatus further includes a second determining module, configured to determine a direction indicated by an instruction received from a remote control device before the scrolling of the display interface as the interface scrolling direction. In some examples, the control information of the first control includes column information of the first control.

The displaying module 62 is configured to control in response to determining the interface scrolling direction is a first direction, and according to the column information of the first control, so as to focus only to a control included in a column in the second display interface, in which the first control is located, so as to display the first preset control having focus in the second display interface, in the same column as the first control. The first preset control is a control that is not displayed in the first display interface and that is adjacent to the first control. In some examples, the control information of the first control includes: row information of the first control.

The displaying module 62 is configured to control, in response to the interface scrolling direction being a second direction and according to the row information of the first control, so as to pass focus only to a control included in a row in the second display interface in which the first control is located, so as to display a second preset control receiving the focus in the second display interface in the same row as the first control. The second preset control is a control that is not displayed in the first display interface and that is adjacent to the first control.

In some examples, the displaying module 62 includes a determining sub-module, configured to determine, according to the control information of the first control and the interface scrolling direction, a second control to receive focus on the second display interface after the scrolling; and a displaying sub-module, configured to display the second control having focus on the second display interface. In some examples, the displaying sub-module is configured to monitor, in response to the scrolling of the display interface, a drawing callback process in a scrolling process of the display interface, the drawing callback process being configured to notify the electronic device of displaying a drawn content; and display, in response to execution of the drawing callback process, the second control receiving the focus of the second display interface.

In some examples, the apparatus further includes: a creating module configured to pre-create a focus finding task before scrolling of the display interface of the electronic device; and a third determining module configured to determine, in response to the focus finding task indicating that a control to receive focus is not found, a control to receive focus after the scrolling of the display interface. The focus finding task is configured to find a control to receive focus in a current display interface.

With regard to the apparatus in the above examples, specific manners of executing operations of the modules are described in detail in the example concerning the method and detailed description will not be repeated here.

Figure 7:
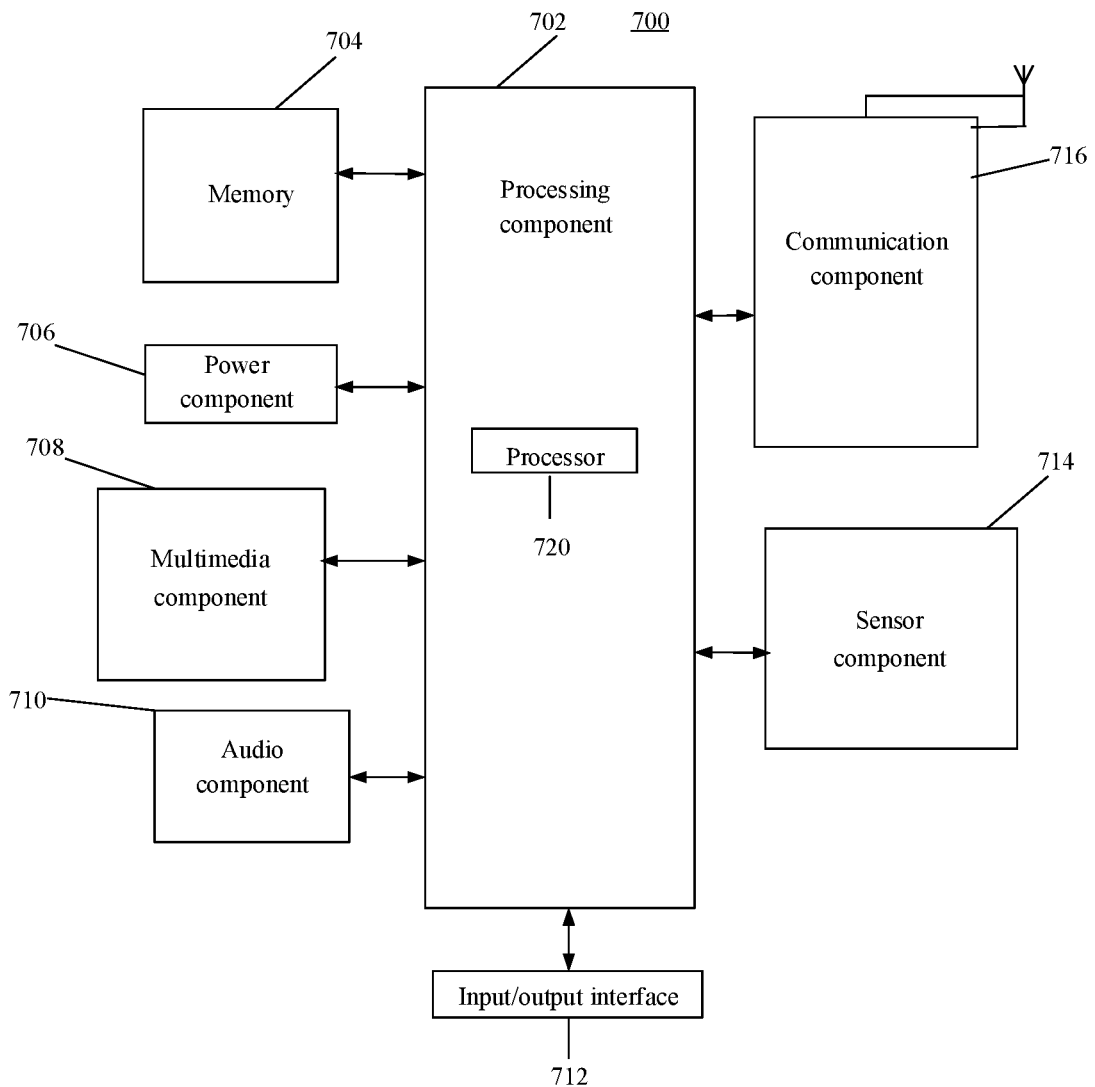
FIG. 7 is a block diagram of an electronic device suitable for implementing the examples of the disclosure.

FIG. 7 is a block diagram of an electronic device 700 suitable for implementing the examples of the disclosure. For instance, the electronic device 700 may be a mobile phone, a computer, a digital broadcasting electronic device, a messaging device, a game console, a tablet device, a medical device, a fitness device, a personal digital assistant, etc.

With reference to FIG. 7, the electronic device 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls overall operations of the electronic device 700, such as operations associated with display, telephone calls, data communication, camera operations, and recording operations. The processing component 702 may include one or a plurality of processors 720 to execute instructions to complete all or part of steps of the above method. In addition, the processing component 702 may include one or a plurality of modules to facilitate interaction between the processing component 702 and other components. For instance, the processing component 702 may include a multimedia module to facilitate interaction between the multimedia component 708 and the processing component 702.

The memory 704 is configured to store various types of data to support operations on the electronic device 700. Instances of these data include instructions for any application program or method operating on the electronic device 700, contact data, phone book data, messages, pictures, videos, etc. The memory 704 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 706 provides power to various components of the electronic device 700. The power component 706 may include a power management system, one or a plurality of power supplies, and other components associated with generation, management, and distribution of the power for the electronic device 700.

The multimedia component 708 includes a screen that provides an output interface between the electronic device 700 and a user. In some examples, the screen may include a liquid crystal display (LCD) and a touch panel (TP). When the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to the touch or wipe operation. In some examples, the multimedia component 708 includes a front camera and/or a rear camera. When the electronic device 700 is in an operation mode, such as a shooting mode or a video mode, the front camera and/or the rear camera may receive external multimedia data. Each front camera and rear camera may be a fixed optical lens system or have focal length and optical zoom capabilities.

The audio component 710 is configured to output and/or input audio signals. For instance, the audio component 710 includes a microphone (MIC). When the electronic device 700 is in the operation mode, such as a call mode, a recording mode, and a voice recognition mode, the microphone is configured to receive external audio signals. The received audio signal may be further stored in the memory 704 or sent via the communication component 716. In some examples, the audio component 710 further includes a speaker for outputting audio signals.

The I/O interface 712 provides an interface between the processing component 702 and a peripheral interface module. The above peripheral interface module may be a keyboard, a click wheel, buttons, etc. These buttons may include but are not limited to: a home button, a volume button, a start button, and a lock button.

The sensor component 714 includes one or a plurality of sensors to provide the electronic device 700 with various aspects of status assessment. For instance, the sensor component 714 may detect an on/off status of the electronic device 700 and relative positioning of a component. For instance, the component is a display and a keypad of the electronic device 700. The sensor component 714 may also detect a position change of the electronic device 700 or a component of the electronic device 700, presence or absence of contact between the user and the electronic device 700, orientation or acceleration/deceleration of the electronic device 700, and a temperature change of the electronic device 700. The sensor component 714 may include a proximity sensor configured to detect presence of a nearby object when there is no physical contact. The sensor component 714 may further include a light sensor, such as a CMOS or CCD image sensor, for use in imaging application. In some examples, the sensor component 714 may further include an acceleration sensor, a gyroscope sensor, a magnetic sensor, a pressure sensor or a temperature sensor.

The communication component 716 is configured to facilitate wired or wireless communication between the electronic device 700 and other devices. The electronic device 700 may access a wireless network based on a communication standard, such as WiFi, 2G or 3G, or a combination of them. In an example, the communication component 716 receives a broadcast signal or broadcast related information from an external broadcast management system via a broadcast channel. In an example, the communication component 716 further includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology and other technologies.

In an example, the electronic device 700 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, so as to execute the above method.

In an example, a non-transitory computer-readable storage medium including instructions is further provided, for instance, the memory 704 including the instructions. The above instructions may be executed by the processor 720 of an electronic device 700 to complete the above method. For instance, the non-transitory computer-readable storage medium may be a ROM, a random access memory (RAM), a CD-ROM, a magnetic tape, a floppy disk, an optical data storage device, etc.

The non-transitory computer-readable storage medium, when the instructions in the storage medium are executed by the processor of the electronic device, the electronic device is configured to perform the focus controlling actions of the method in the above examples.

After considering the specification and practicing the disclosure disclosed herein, those of skill in the art will easily think of other examples of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are to be regarded as illustrative.

It should be understood that the disclosure is not limited to the precise structure that has been described above and shown in the drawings, and various modifications and changes can be made without departing from its scope. The scope of the present disclosure is limited by the appended claims.

What is claimed is:

1. A focus controlling method, applied to an electronic device, and comprising:
   during scrolling of a display interface of the electronic device, determining, in response to the scrolling of the display interface, control information of a first control having a first focus in a first display interface before the scrolling,
   wherein the display interface is one of a displayed picture or graphical interface presented by the electronic device and the first display interface is a display of the display interface at a first time before the scrolling,
   wherein the first focus is a position on the display interface at which a current cursor is activated, and the first focus indicates one control element of a plurality of control elements of the display interface that is selected or one control element to be operated,
   wherein each display interface includes a single focus,
   wherein the first control having the first focus in the first display interface before the scrolling is a control having a focus closest to a time before the scrolling began, and
   wherein the control information of the first control comprises at least one of row information of the first control and column information of the first control; and
   displaying, according to the control information of the first control and an interface scrolling direction, a second control to receive a second focus of a second display interface after the scrolling,
   wherein the second display interface is a display of the display interface at a second time after the scrolling, and
   wherein the second focus is a position on the display interface at which a current cursor is activated, and the second focus indicates one control element of a plurality of control elements of the display interface that is selected or one control element to be operated.

2. The method according to claim 1, wherein the interface scrolling direction is determined by
   determining a direction indicated by an instruction received from a remote control device before the scrolling of the display interface as the interface scrolling direction.

3. The method according to claim 1, wherein the control information of the first control comprises the column information of the first control, and wherein displaying, according to the control information of the first control and the interface scrolling direction, the second control to receive the second focus of the second display interface after the scrolling comprises:
   controlling the display, in response to determining the interface scrolling direction is a first direction, and according to the column information of the first control, so as to give a focus only to a control that is included in a same column in which the first control is located in the second display interface, so as to pass the focus to a first preset control displayed in the second display interface having the same column as the first control, wherein the first preset control is a control that is not displayed in the first display interface and that is adjacent to the first control.

4. The method according to claim 1, wherein the control information of the first control comprises row information of the first control, and wherein displaying, according to the control information of the first control and the interface scrolling direction, the second control to receive the second focus of the second display interface after the scrolling comprises:

controlling the display, in response to determining the interface scrolling direction is a second direction, and according to the row information of the first control, so as to give a focus only to a control that is included in a same row in which the first control is located in the second display interface, so as to pass the focus to a second preset control displayed in the second display interface having the same row as the first control, wherein the second preset control is a control that is not displayed in the first display interface and that is adjacent to the first control.

5. The method according to claim 1, wherein displaying, according to the control information of the first control and the interface scrolling direction, the second control to receive the second focus of the second display interface after the scrolling comprises:

determining, according to the control information of the first control and the interface scrolling direction, the second control to receive the second focus on the second display interface after the scrolling; and displaying the second focus on the second control of the second display interface.

6. The method according to claim 5, wherein displaying the second focus on the second control of the second display interface comprises:

monitoring, in response to the scrolling of the display interface, a drawing callback process in a scrolling process of the display interface, wherein the drawing callback process is configured to notify the electronic device of displaying a drawn content; and displaying, in response to execution of the drawing callback process, the second focus on the second control of the second display interface.

7. The method according to claim 1, wherein before the scrolling of the display interface of the electronic device, the method further comprises:

pre-creating a focus finding task configured to find a control to receive a focus in a current display interface; and determining, in response to the focus finding task indicating that the control to receive the focus is not found, a control to receive a focus after the scrolling of the display interface.

8. An electronic device, comprising:
a processor; and
a memory configured to store instructions executable by the processor;
wherein, when the processor executes the instructions the processor is configured to:

during scrolling of a display interface of the electronic device, determine, in response to scrolling of the display interface, control information of a first control having a first focus in a first display interface before the scrolling, wherein the display interface is one of a displayed picture or graphical interface presented by the electronic device and the first display interface is a display of the display interface at a first time before the scrolling, wherein the first focus is a position on the display interface at which a current cursor is activated, and the first focus indicates one control element of a plurality of control elements of the display interface that is selected or one control element to be operated, wherein each display interface includes a single focus, wherein the first control having the first focus in the first display interface before the scrolling is a control having a focus closest to a time before the scrolling began, and wherein the control information of the first control comprises at least one of row information of the first control and column information of the first control; and display, according to the control information of the first control and an interface scrolling direction, a second control to receive a second focus of a second display interface after the scrolling, wherein the second display interface is a display of the display interface at a second time after the scrolling, and wherein the second focus is a position on the display interface at which a current cursor is activated, and the second focus indicates one control element of a plurality of control elements of the display interface that is selected or one control element to be operated.

9. The electronic device according to claim 8, wherein the interface scrolling direction is determined by determining a direction indicated by an instruction received from a remote control device before the scrolling of the display interface as the interface scrolling direction.

10. The electronic device according to claim 8, wherein the control information of the first control comprises the column information of the first control; and wherein the processor is further configured to:

control, in response to determining the interface scrolling direction is a first direction and according to the column information of the first control, to give a focus only to a control that is included in a same column in which the first control is located in the second display interface, so as to pass the focus to a first preset control displayed in the second display interface having the same column as the first control, wherein the first preset control is a control that is not displayed in the first display interface and that is adjacent to the first control.

11. The electronic device according to claim 8, wherein the control information of the first control comprises the row information of the first control; and wherein the processor is further configured to:

control, in response to determining the interface scrolling direction being a second direction and according to the row information of the first control, to give a focus only to a control included in a same row in which the first control is located in the second display interface, so as to pass the focus to a second preset control displayed in the second display interface having the same row as the first control, wherein the second preset control is a control that is not displayed in the first display interface and that is adjacent to the first control.

12. The electronic device according to claim 8, wherein the processor is further configured to:
- determine, according to the control information of the first control and the interface scrolling direction, the second control to receive the second focus on the second display interface after the scrolling; and
- display the second focus on the second control of the second display interface.

13. The electronic device according to claim 12, wherein the processor is further configured to:
- monitor, in response to the scrolling of the display interface, a drawing callback process in a scrolling process of the display interface, wherein the drawing callback process is configured to notify the electronic device of displaying a drawn content; and
- display, in response to execution of the drawing callback process, the second focus on the second control of the second display interface.

14. The electronic device according to claim 8, wherein the processor is further configured to:
- pre-create a focus finding task configured to find a control to receive a focus in a current display interface; and
- determine, in response to the focus finding task indicating that the control to receive the focus is not found, a control to receive a focus after the scrolling of the display interface.

15. A non-transitory computer-readable storage medium, storing thereupon a computer program comprising computer executable instructions, wherein when the computer executable instructions are executed by a processor of an electronic device, the electronic device is configured to:
- during scrolling of a display interface of the electronic device, determine, in response to scrolling of the display interface, control information of a first control having a first focus in a first display interface before the scrolling,
- wherein the display interface is one of a displayed picture or graphical interface presented by the electronic device and the first display interface is a display of the display interface at a first time before the scrolling,
- wherein the first focus is a position on the display interface at which a current cursor is activated, and the first focus indicates one control element of a plurality of control elements of the display interface that is selected or one control element to be operated,
- wherein each display interface includes a single focus,
- wherein the first control having the first focus in the first display interface before the scrolling is a control having a focus closest to a time before the scrolling began, and
- wherein the control information of the first control comprises at least one of row information of the first control and column information of the first control; and
- display, according to the control information of the first control and an interface scrolling direction, a second control to receive a second focus of a second display interface after the scrolling,
- wherein the second display interface is a display of the display interface at a second time after the scrolling, and
- wherein the second focus is a position on the display interface at which a current cursor is activated, and the second focus indicates one control element of a plurality of control elements of the display interface that is selected or one control element to be operated.

* * * * *

UNITED STATES PATENT AND TRADEMARK OFFICE
CERTIFICATE OF CORRECTION

| | | |
|---|---|---|
| PATENT NO. | : 12,248,805 B2 | Page 1 of 1 |
| APPLICATION NO. | : 17/681068 | |
| DATED | : March 11, 2025 | |
| INVENTOR(S) | : Wenju Song | |

It is certified that error appears in the above-identified patent and that said Letters Patent is hereby corrected as shown below:

In the Specification

In Column 1, Line 9, delete "2021109305429" and insert -- 202110930542.9 --, therefor.

In Column 4, Line 37, delete "is located is" and insert -- is located --, therefor.

In Column 5, Line 27, delete "is or is" and insert -- or --, therefor.

In Column 5, Line 58, delete "in the is" and insert -- is --, therefor.

In Column 6, Line 8, delete "that the" and insert -- than the --, therefor.

In Column 9, Line 50, delete "drawing" and insert -- drawn --, therefor.

Signed and Sealed this
Twentieth Day of May, 2025

Coke Morgan Stewart
*Acting Director of the United States Patent and Trademark Office*